(No Model.)
W. I. ATWOOD.
DASH FRAME FOR VEHICLES
No. 337,294. Patented Mar. 2, 1886.
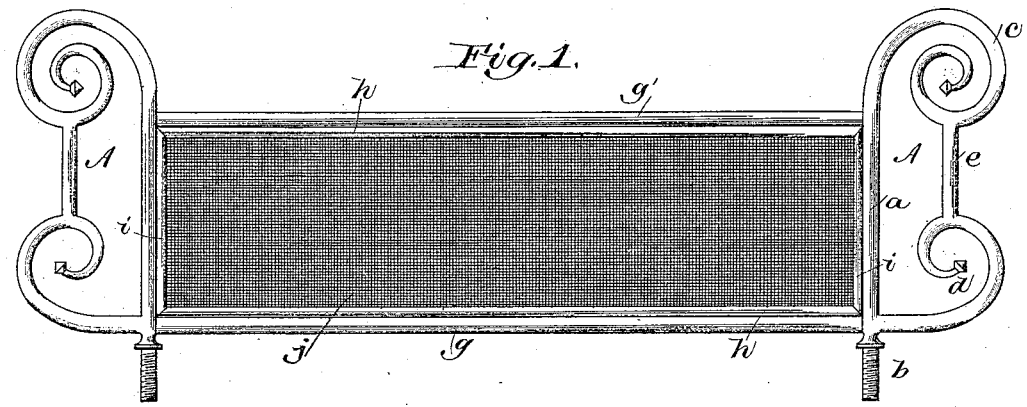
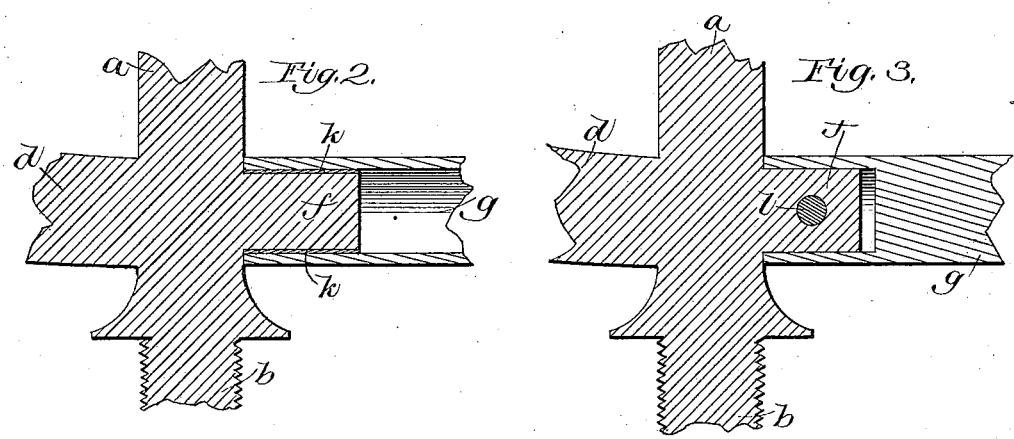
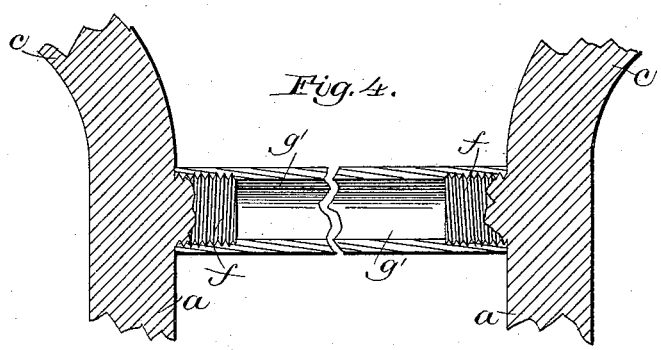
Witnesses
Eugene Humphrey
Joseph Willard
Inventor
Washington Irving Atwood
per E. W. Porter, Atty.

UNITED STATES PATENT OFFICE.

WASHINGTON IRVING ATWOOD, OF AMESBURY, MASSACHUSETTS.

DASH FRAME FOR VEHICLES.

SPECIFICATION forming part of Letters Patent No. 337,294, dated March 2, 1886.

Application filed October 3, 1885. Serial No. 178,875. (No model.)

*To all whom it may concern:*

Be it known that I, WASHINGTON IRVING ATWOOD, of Amesbury, in the county of Essex and State of Massachusetts, have invented a new and useful Improvement in Metallic Dasher-Frames for Vehicles, which will, in connection with the accompanying drawings, be hereinafter fully described, and specifically defined in the appended claim.

Figure 1 is a side elevation of a dasher embodying my invention. Fig. 2 is a detached longitudinal vertical section showing the method of securing the ornamental ends to the longitudinal bars by soldering the same together. Fig. 3 is a similar section showing the end and bar secured together by a pin. Fig. 4 is a like section showing the ends and bar secured together by right and left hand screw-threads.

My invention relates to dasher-frames which are formed with ornamental ends; and it consists in a dasher-frame having such ends formed as castings and united by parallel bars, which are either solid, rolled, or drawn rods socketed to said ends, or are tubes of proper size and strength.

Referring to the drawings, A A represent the ornamental cast-metal ends, which are shown as formed with a vertical member, $a$, terminating at bottom in a shouldered screw-threaded stud, $b$, which enters a suitable supporting-eye, secured in proper position upon the vehicle, and by its shoulder and a threaded nut serves to secure the dasher in position. Said member $a$ is shown as terminating at top in an outwardly-turning scroll, $c$, while a lateral member, $d$, extending from $a$, terminates in a scroll, which, by bar $e$, is connected with upper scroll, $c$.

Upon the inner side of members $a$ are formed the short studs or members $f$, at a distance apart equal to the required width of the dasher. Ends A are united by the parallel bars $g\ g'$, which may be firmly secured upon studs $f$ by solder or brazing, as indicated at $k$, Fig. 2, or by closely socketing the parts together, and securing by a rivet, screw, or pin, as indicated at $l$, Fig. 3; or by right and left hand screw-threads, as indicated in Fig. 4; or, if preferred, the rods $g\ g'$ may be duly prepared, and the ends A united therewith in the act of casting the latter, in the manner well known to metal-founders.

In Fig. 1, $h\ h$ represent the horizontal bars, and $i\ i$ the end bars of the screen-frame, to which the wire-netting $j$ is secured; but the screen-frame and the attached netting form no part of my invention.

The bars $g\ g'$ may be formed of solid, rolled, or drawn rods, as shown in Fig. 3, or of tubing, as shown in Figs. 2 and 4.

As dashers are required to be of various lengths, and as the style in that behalf varies from year to year, therefore the attempt to maintain an assortment of patterns for the numerous widths required is attended with great expense; but by means of my invention but one pair of patterns are requisite for all widths of dashers, as the bars $g\ g'$ can be cut from the rods or tubes of commerce of the requisite length to form dashers of any desired width, thus effecting a large saving in expense in the matter of patterns, and producing a dasher of superior strength and quality.

The ornamental ends A may be of any desired design or pattern that style or fancy may dictate.

I claim as my invention—

A dasher-frame formed of cast metal ornamental ends united by longitudinal bars cut from tubing or solid rolled or drawn rods, and united and secured together, substantially as specified.

WASHINGTON IRVING ATWOOD.

Witnesses:
GEORGE H. BRIGGS,
GEO. L. KNIGHT.